United States Patent [19]

Glabe et al.

[11] 4,015,018

[45] Mar. 29, 1977

[54] SILAGE PROCESS AND PRODUCT

[75] Inventors: Elmer F. Glabe, Northbrook, Ill.; Herbert J. Rebhan, New Richmond, Wis.

[73] Assignee: Food Technology Products, Chicago, Ill.

[22] Filed: Feb. 19, 1976

[21] Appl. No.: 659,211

Related U.S. Application Data

[63] Continuation-in-part of Ser. No. 629,500, Nov. 6, 1975, abandoned.

[52] U.S. Cl. .................................... 426/2; 426/54; 426/335; 426/532; 426/583; 426/636; 426/807

[51] Int. Cl.[2] ........................................ A23K 3/03

[58] Field of Search ............ 426/2, 31, 53, 54, 583, 426/807, 335, 532, 636, 635

[56] References Cited

UNITED STATES PATENTS

| 2,412,596 | 12/1946 | Bauer et al. ................. 426/583 X |
|---|---|---|
| 3,925,559 | 12/1975 | Glabe et al. ................. 426/623 X |

*Primary Examiner*—A. Louis Monacell
*Assistant Examiner*—R. A. Yoncoskie
*Attorney, Agent, or Firm*—Johnston, Keil, Thompson & Shurtleff

[57] ABSTRACT

Forage crops such as perennial grasses, alfalfa, corn and sorghum in the wet or moist state are chopped into small pieces, a quantity of a composition consisting essentially of sodium diacetate and dehydrated whey is added, and the resultant mixture is placed in a storage container such as a silo and allowed to ferment to produce silage which is useful as an animal feed, especially for ruminant animals such as beef and dairy cattle.

10 Claims, No Drawings

SILAGE PROCESS AND PRODUCT

This application is a continuation-in-part of application Ser. No. 629,500, filed Nov. 6, 1975 now abandoned.

BACKGROUND

Silage is made by harvesting crops of perennial legumes and grasses such as, for example, alfalfa, trefoil, clovers, orchard grass, annuals such as sudan grass, sorghum, timothy, bluestem and corn. The harvest takes place at the ideal maturity stage which, in the case of legume silage is full bud, in the case of grass silage the boot stage, in the case of corn silage, full dent, and in the case of sorghum sudan silage when fully headed. The proper moisture content for ensiling is approximately 65-75% by weight for corn silage, 50-60% by weight for legume/grass silage for large silos using a finer chop, 60-70% by weight for smaller silos and bunker/trench silos.

The harvested crop is processed through a chopping machine usually reducing the entire cut plant to pieces approximately ½ inch in length or less but more than ¼ inch. These pieces are then placed in a silo or storage container. The most common container on the farm is the tall concrete structure silo. Some versions of the silo are glass-lined.

When forage crops are placed in the silo, sugars from these plants are converted by yeast organisms to carbon dioxide and water, along with heat production. Due to the limited oxygen supply in the silo, some of the sugars are converted to ethyl alcohol which in turn is oxidized to acetic acid due to the presence of acetic acid producing bacteria.

The production of acetic acid continues until the concentration is so high that the bacteria themselves are affected. The numbers of bacteria decrease and their activity in producing acetic acid stops.

Coincidental with the production of acetic acid by one or more types of bacteria, other types of bacteria produce lactic acid from the plant sugars.

The entire fermentation procedure generally takes about twenty days. If the fermentation has gone properly, all of the oxygen will have been used up in the silo or storage container. Furthermore, the contents of the silo will contain relatively high levels of acetic and lactic acids. This combination of materials and conditions will successfully prevent the growth of mold because mold growth is inhibited by a highly-acid environment and is generally stopped in an atmosphere devoid of oxygen. Molds are aerobic organisms.

If the fermentation procedure has not gone properly, there will be an insufficient amount of lactic acid present, allowing for the production of butyric acid. Furthermore, the lack of lactic acid allows for the reduction of protein and other nutrients in the silage, thereby reducing the nutritive value of the feed.

OBJECTS

One of the objects of the present invention is to provide a new and improved process for producing silage in which the nutritive value is enhanced and the reduction of protein and other nutrients in the silage is minimized.

Another object of the invention is to provide a new and useful composition for use in the production of silage containing a synergistic combination of edible non-toxic substances which aid in the fermentation at an earlier stage in the fermentation process and inhibit the formation of undesirable butyric acid.

Still a further object of the invention is to produce new and improved animal feeds containing silage which are especially useful in feeding beef and dairy cattle and other ruminants and which, when fed to dairy cattle, enhance milk production. Other objects will appear hereinafter.

BRIEF SUMMARY OF THE INVENTION

In accordance with the invention forage crops such as perennial grasses of the type previously described with or without corn stalks are chopped into small pieces while they are still in green state and before any substantial amount of normal drying has taken place, and intimately mixed with a composition of sodium diacetate and dehydrated whey in synergistic proportions and then fermented in a silo or other storage container, the quantity of the sodium diacetate and whey composition being sufficient to inhibit protein reduction during the fermentation and also to inhibit the formation of undesirable butyric acid, thereby producing a silage product after the completion of the fermentation which has enhanced protein availability and enhanced nutritive value, especially for use as an animal feed in feeding beef cattle, dairy cattle, sheep and other ruminant animals.

DETAILED DESCRIPTION OF THE INVENTION

Sodium diacetate is non-toxic to man or animals since it metabolizes directly to carbon dioxide and water, leaving no residue in the tissues. It is not corrosive to equipment and may be safely handled by human beings using ordinary precautions.

A most important feature of sodium diacetate is that it does inhibit mold without inhibiting the desirable bacteria and yeast activity. Similarly, and equally important, sodium diacetate provides additional acetic acid on hydrolysis, thereby adding a desirable compound to the silage. It has been shown that the acetic acid molecule is an important molecule during the manufacture of butterfat in the biochemical processes of the mammary glands of the cow.

Dehydrated whey is obtained by drying liquid whey which is a principal by-product of the cheese industry and is obtained after the removal of casein and fat from milk which is processed in making cheese. The residual liquid which contains protein, lactose and lactoalbumen as well as minor amounts of fat and minerals usually contains over 90% water which is largely removed by spray drying or some other form of dehydration to produce the dehydrated whey solids that are employed in the practice of the present invention. A typical analysis of dehydrated whey is as follows:

| | |
|---|---|
| Moisture | 4.5% |
| Protein* | 12.9% |
| Fat | 1.1% |
| Total Carbohydrate** | 73.5% |
| Ash (calcium, phosphorous, iron) | 8.0% |

*50% lactoalubumen
**the carbohydrate is virtually all lactose, only a fraction of a percent is dextrose.

Usually the vegetation to be fermented will contain at least 40% by weight water.

As previously pointed out, silage can be made from a variety of green plant substances cut before any natural drying has taken place. The cut materials are chopped into small pieces and conveyed into a silo or storage container where fermentation takes place. During this fermentation, both acetic and lactic acids are produced by bacterial organisms which are present on the green plant materials. These organisms convert natural sugars into some ethyl alcohol, carbon dioxide, and acetic and lactic acids.

Sodium diacetate in combination with whey provides an ideal combination of chemical substances to aid the fermentation and to make more of the essential nutritive acetic acid and to make quantities of acetic and lactic acid at an earlier stage in the fermentation process to prevent the formation of the undesirable butyric acid. There is some indication that sodium diacetate reacts with the lactose of the whey to manufacture additional lactic acid.

A typical additive for use in making silage in accordance with the invention has the following composition:

TABLE I

| Ingredients | Per Cent by Weight |
|---|---|
| Sodium diacetate | 50.0% |
| Sprayed-dried whey | 35.3% |
| Calcium carbonate | 8.2% |
| Bentonite (a silicate compound) | 5.0% |
| Mineral or Coconut Oil | 1.0% |
| Zeolex (sodium aluminosilicate anti-caking agent) | .50% |
|  | 100.00% |

Of the above ingredients, sodium diacetate and whey are the only effective components in the silage-making process. Calcium carbonate and bentonite are antihumectants for sodium diacetate and the whey. They act as free-flowing agents permitting easy distribution. The coconut oil or mineral oil is an anti-dusting factor. Other anti-humectants and other anti-dusting factors which are chemically inert and edible as well as non-toxic can be employed. In general, the sodium diacetate will comprise 40–75% by weight of the additive composition and the weight ratio of sodium diacetate to dehydrated whey will be within the range of 7.5:1 to 1:4. The amount of dehydrated whey is preferably at least 15% by weight of the composition and the amount of inert ingredients preferably does not exceed 15% by weight of the composition.

In order to evaluate the invention, tests were made to demonstrate that additive compositions of the type described when added to silage materials prior to fermentation produce a very desirable effect on the finished silage by raising the level of protein available to animals through their digestive processes. As reported by H. Crowley in the 1972 Edition of the "Dairy Feeding Handbook": "The cell contents of vegetable materials are easily soluble starches, sugars, and proteins and small amounts of soluble minerals, vitamins, and fats. Essentially all of these nutrients within the cell are digested and used by either ruminants or non-ruminant animals. The cell-wall contents are generally less available but may be used by ruminants. Part of the cellulose and hemicellulose of the cell walls may be digested. However, the degree of digestibility depends on other factors in the feed."

Van Soest of the U.S. Department of Agriculture, by an analytical method, "Acid Detergent Analysis of Feeds", has shown that there is a close relationship between the availability of protein determined by this method of analysis and actual feeding tests in which the availability of the protein was measured by growth and weight increase responses. The analytical data include calculation of the available protein on a common moisture basis of 10 percent. This makes comparison easy and factual, since silage does vary in moisture content due to the natural moisture content varying when the plant materials are cut and placed in the silo.

The invention will be further illustrated but is not limited by the following examples in which quantities are by weight unless otherwise indicated.

EXAMPLE I

This example shows a comparison of protein available in freshly chopped untreated silage made from grasses and silage treated prior to fermentation with 3 pounds of an additive composition containing sodium diacetate and dehydrated whey, together with anti-humectants and an anti-dusting factor in the proportions in the typical composition previously given.

The factor shown as "Availability Rating" demonstrates that due to the heat developed during the silage-making process, the protein becomes more tightly attached to the fiber thereby reducing the availability of the protein. Sodium diacetate and whey provide a chemical mechanism which significantly increases the protein availability.

The results are shown in the following table:

TABLE II

|  | Treatment | Percent Moisture | Available Crude Protein - 10% Moisture Basis | Protein Availability Rating |
|---|---|---|---|---|
| Freshly chopped grass | None | 53.9 | 15.8 | 80 |
| Freshly chopped grass | Sodium Di-acetate-whey additive - 3 lbs. per ton | 52.6 | 17.9 | 91 |
| Freshly chopped grass | Sodium di-acetate-whey additive - 3 lbs. per ton | 44.8 | 15.9 | 87 |

The data in Table II show that the presence of the sodium diacetate-whey additive during the fermentation of the silage increase the Protein Availability Rating by 11%. Expressed in another way, the presence of the sodium diacetate-whey additive prevented the decrease of protein available occurring in natural fermentation by 11%.

EXAMPLE II

A large number of field tests were carried out and data was collected and averaged. Some 30 untreated, unfermented silage products showed an average Protein Availability Rating of 81%. After fermentation in the silo for the usual period required to complete the fermentation, the Protein Availability Rating diminished to 72%.

A similar number of silage tests in which the sodium diacetate-whey composition was added at the rate of 3 pounds per ton showed a Protein Availability Rating in the finished silage of 79%. Thus, it is apparent that the presence of the sodium diacetate-whey composition inhibited the Protein Availability Rating against the severe drop shown by the untreated silage tests.

EXAMPLE III

Translating the data set forth in Example II into economics of feed value to dairy cows, data is derived as shown in the following table:

TABLE III

| Description | Harvested Feed Value After Silo Processing | Feed Value Per Ton |
| --- | --- | --- |
| Untreated - 60% Moisture Fermented Silage at 16% Protein | 89% | $66.64 |
| Sodium Diacetate-Whey additive Treated- | 98% | $73.50 |

TABLE III-continued

| Description | Harvested Feed Value After Silo Processing | Feed Value Per Ton |
| --- | --- | --- |
| 65% Moisture Fermented Silage at 16% Protein | | |

A dairy cow eating each of the above two silage feeds for equivalent periods of time would produce 4–5 lbs. more milk per day when eating the sodium diacetate-whey additive treated feed. This is based on the fact that the treated silage would have 3.9 lbs. of available crude protein per 30 lbs. of silage (dried basis), as opposed to only 3.5 lbs. of available protein in the untreated silage.

The milk production per pound of feed per cow per day as influenced by the amount of sodium diacetate added to the silage should be in the range of 0.5 to 20 lbs. of sodium diacetate per ton of silage. Four pounds of sodium diacetate per ton would be 1 lb. of sodium diacetate per 480 lbs. of feed.

EXAMPLE IV

The composition described in Table I was used in preparing hay silage with the results shown in the following table based on laboratory acid detergent fiber analyses of 32 paired forage tests employing 1 lb. per ton of the composition of Table I:

TABLE IV

| Hay Silage | Moisture | *Available crude Protein | *Total crude Protein | Crude Protein Available for digestion | Harvested feed value preserved | **Feed Value per ton |
| --- | --- | --- | --- | --- | --- | --- |
| Fresh unfermented feed at chopping | 61.4% | 13.2% | 16.2% | 81% | — | $80.00 |
| Ensiled untreated fermented | 57.5% | 11.7% | 16.5% | 69% | 85% | $68.00 |
| Ensiled sodium diacetate-whey treated fermented | 61.9% | 12.9% | 17.1% | 75% | 93% | $74.40 |
| Gain using sodium diacetate-whey | — | 10.2% | 3.6% | 8.7% | 9.4% | $6.40 |

*10% moisture basis
**based on excellent quality hay

In the foregoing examples the quantity of the sodium diacetate whey composition can be varied. In most cases on all silages (corn, grass, legume, oats) satisfactory results are obtained at just 1 lb. of the sodium diacetate-whey composition per ton of silage which corresponds to 0.05% of sodium diacetate. For high moisture grains at 25–35% moisture the rate of application of the sodium diacetate-whey composition is preferably 2 lbs. per ton. In general, the quantity of sodium diacetate added in making the silage is within the range of 0.5 to 20 lbs. per ton of silage which corresponds to 0.025 to 1% by weight of the silage.

The sodium diacetate-whey composition can be added with a mechanical applicator at a blower or spread evenly on the bottom of the chopper box or on top of the load, or in any other suitable manner. Silage crops are preferably placed in the silo immediately after chopping and the sodium diacetate-whey composition is added either before or after the silage crops are placed in the silo. Uniform or even distribution of the added sodium diacetate-whey composition is desirable. The last loads into the silo should be higher in moisture to allow for more compaction. This reduces air space, a cause of spoilage. The load should be covered with a plastic sheet after the silo is filled.

Silage products produced in accordance with the invention provide feeds for herbivorous animals and especially for ruminant animals, including cattle, goats, sheep and camels which have a higher protein value than ordinary silage.

The invention is hereby claimed as follows:

1. A process of making silage which comprises intimately mixing with moisture-containing chopped vegetation from which the silage is produced a quantity of sodium diacetate and dehydrated whey in synergistic proportions, and fermenting the resultant mixture, the proportions of sodium diacetate and dehydrated whey being sufficient to enhance the protein availability of the finished silage.

2. A process as claimed in claim 1 in which said chopped vegetation is a forage crop comprising one or more green fermentable substances from the group consisting of alfalfa, trefoil, clovers, annuals such as Sudan grass, sorghum, timothy, bluestem and corn stalks.

3. A process as claimed in claim 1 in which the moisture containing chopped vegetation contains at least 40% by weight water.

4. A process as claimed in claim 1 in which the quantity of sodium diacetate is within the range of 0.5 pound to 20 pounds per ton of silage and the dehydrated whey is at least 15% by weight of the total sodium diacetate and whey.

5. A composition for use in making silage consisting essentially of a mixture of sodium diacetate and dehydrated whey in which the quantity of sodium diacetate comprises 40 to 75% by weight and the quantity of dehydrated whey is at least 15% by weight, the remainder being inert ingredients which have no substantial effect on the silage process when the composition is used in making silage.

6. A composition as claimed in claim 5 in which said inert ingredients comprise one or more antihumectants.

7. A composition as claimed in claim 5 in which said inert ingredients comprise an anti-dusting factor.

8. A product resulting from the process of claim 1.

9. An animal feed for herbivorous animals comprising a product as claimed in claim 8.

10. A process of feeding herbivorous animals which comprises feeding such animals a product as claimed in claim 8.

* * * * *